United States Patent
You et al.

(10) Patent No.: US 11,737,192 B2
(45) Date of Patent: Aug. 22, 2023

(54) LIGHTING EFFECT CONTROL METHOD, SYSTEM, APPARATUS, ELECTRONIC DEVICE, AND STORAGE MEDIUM

(71) Applicant: Shenzhen Intellirocks Tech. Co., Ltd., Shenzhen (CN)

(72) Inventors: Jie You, Shenzhen (CN); Wenlong Wu, Shenzhen (CN)

(73) Assignee: SHENZHEN INTELLIROCKS TECH. CO., LTD., Shenzhen (CN)

( * ) Notice: Subject to any disclaimer, the term of this patent is extended or adjusted under 35 U.S.C. 154(b) by 0 days.

(21) Appl. No.: 18/066,568

(22) Filed: Dec. 15, 2022

(65) Prior Publication Data
US 2023/0217570 A1   Jul. 6, 2023

(30) Foreign Application Priority Data
Dec. 31, 2021   (CN) .......................... 202111672897.9

(51) Int. Cl.
*G06V 20/40* (2022.01)
*H05B 47/105* (2020.01)

(52) U.S. Cl.
CPC ........... *H05B 47/105* (2020.01); *G06V 20/41* (2022.01); *G06V 20/49* (2022.01)

(58) Field of Classification Search
None
See application file for complete search history.

(56) References Cited

U.S. PATENT DOCUMENTS

| | | | |
|---|---|---|---|
| 2015/0324636 A1* | 11/2015 | Bentley ................. | A63F 13/212 386/227 |
| 2017/0364747 A1* | 12/2017 | Ekambaram ........... | G06V 20/20 |
| 2018/0189568 A1* | 7/2018 | Powderly ............... | G06V 40/19 |
| 2019/0371028 A1* | 12/2019 | Harrises ................. | G06T 11/60 |
| 2020/0005138 A1* | 1/2020 | Wedig ...................... | G06N 3/08 |
| 2020/0089954 A1* | 3/2020 | Zia ......................... | G06V 20/64 |
| 2021/0326428 A1* | 10/2021 | Edwards ................ | G06V 20/20 |
| 2022/0066544 A1* | 3/2022 | Kwon ..................... | G06T 7/20 |
| 2022/0086393 A1* | 3/2022 | Peters .................... | G06V 20/41 |
| 2022/0207816 A1* | 6/2022 | Marra .................. | H04N 13/344 |

* cited by examiner

*Primary Examiner* — Wilson Lee
(74) *Attorney, Agent, or Firm* — KIP Legal Services, PLLC (57) ABSTRACT

A lighting effect control method includes: obtaining a video frame image sequence by dividing frames of a to-be-tested video stream; sequentially acquiring one of untraversed video frame images in the video frame image sequence as a testing video frame image; according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and controlling the lighting effect of a lighting device based on the state information.

20 Claims, 4 Drawing Sheets

LIGHTING EFFECT CONTROL METHOD, SYSTEM, APPARATUS, ELECTRONIC DEVICE, AND STORAGE MEDIUM

CROSS-REFERENCES TO RELATED APPLICATIONS

This application claims priority to Chinese Patent Application No. CN202111672897.9, filed on Dec. 31, 2021, the content of which is hereby incorporated by reference in entirety.

FIELD OF THE TECHNOLOGY

The present disclosure relates to the field of lighting equipment control technology and, more specifically, to a lighting effect control method, system, apparatus, electronic device, and storage medium.

BACKGROUND OF THE DISCLOSURE

Currently, with the improvement of people's general living conditions, there are higher demands for material life, and smart homes have been developed rapidly, as more and more people have started to use smart homes. As lighting equipment is an important part of smart homes, gradually, people's requirements for the lighting equipment can no longer be met with the simple lighting function.

However, according to the present disclosure, existing lighting effect control technology often performs light control just based on the overall color of the images displayed by a display device, and such lighting effect control may lack options, affecting the user experience of the lighting equipment.

The disclosed methods and apparatus are directed to solve one or more problems set forth above and other problems.

SUMMARY

The present disclosure provides a lighting effect control method, system, apparatus, electronic device, and storage medium.

According to one aspect of the present disclosure, a lighting effect control method is provided. The method includes obtaining a video frame image sequence by dividing frames of a to-be-tested video stream; sequentially acquiring one of untraversed video frame images in the video frame image sequence as a testing video frame image; according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and controlling the lighting effect of a lighting device based on the state information.

According to another aspect of the present disclosure, an electronic device is provided. The electronic device includes one or more processors; and a memory coupled to the processors and storing one or more application programs. The one or more application programs are configured to be executed by the one or more processors to perform: obtaining a video frame image sequence by dividing frames of a to-be-tested video stream; sequentially acquiring one of untraversed video frame images in the video frame image sequence as a testing video frame image; according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and controlling the lighting effect of a lighting device based on the state information.

According to another aspect of the present disclosure, a non-transitory computer-readable storage medium is provided. The non-transitory computer-readable storage medium contains computer-executable program codes for, when executed by one or more processors, performing a lighting effect control method. The method includes: obtaining a video frame image sequence by dividing frames of a to-be-tested video stream; sequentially acquiring one of untraversed video frame images in the video frame image sequence as a testing video frame image; according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and controlling the lighting effect of a lighting device based on the state information.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

At present, with the continuous development of smart homes, there are broad applications of various smart home devices. As an important part of smart homes, lighting equipment is no longer just limited to the lighting function.

With the change in people's demands for the lighting equipment, the lighting equipment is going in the direction of more and more lighting effects, and with more and more sensitive responses. People begin to combine lighting equipment with other equipment, such as controlling the lighting effects of lighting equipment based on the audio from the speakers and the display contents on TVs.

Further, with the popularity of the Internet, online games have become an entertainment method for more and more young people. Therefore, in order to enable the users to better immerse themselves in the gaming atmosphere during the games, it becomes challenging for the lighting effect of the lighting equipment to promptly follow the changes on the game. interfaces. The existing technology often performs the lighting effect control based on the overall color of the images displayed on the display device, and the lighting effect control is monotonous, affecting the user experience of the games.

In order to improve the above problems and/or other technical problems, the present disclosure provides an improved lighting effect control method, apparatus, electronic device, and storage medium. For example, the lighting effect control method includes, obtaining a sequence of video frame images by dividing frames of a to-be-tested video stream; from the sequence of video frame images, sequentially acquiring one video frame image not traversed as a testing video frame image; based on a recognition result of the testing video frame image, if it is determined that the testing video frame image includes a target virtual object, determining state information of the target virtual object in the testing video frame image, where the recognition result of the testing video frame image is obtained by performing an image recognition process on the testing video frame image; and controlling the lighting effect of the lighting equipment based on the state information, such that the lighting effect can be changed according to the content displayed in the video frame images, greatly enriching the lighting effect control process.

Figure 1:
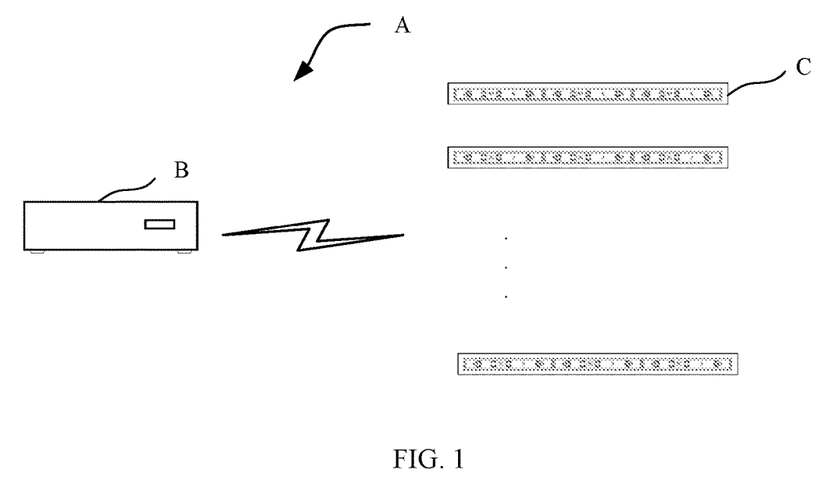
FIG. 1 illustrates a block diagram of an application environment according to an embodiment of the present disclosure.

FIG. 1 illustrates an application environment of a lighting effect control system provided by embodiments of the present disclosure. As shown in FIG. 1, the lighting effect control system A according to an embodiment of the present disclosure includes: a control device B and a lighting device C.

In some embodiments, the control device B may be used to obtain the to-be-tested video stream. The control device B may include a hardware interface for obtaining the to-be-tested video stream.

In some embodiments, the control device B can be connected to an XBOX (home video game console), a PS (PlayStation, electronic game console), or other devices through the hardware interface, so as to obtain the to-be-tested video stream.

In some embodiments, the control device B may further include a control unit. For example, the control unit may include an SOC (System on Chip), CPU (central processing unit), MPU (Microcontroller Unit), etc., which can be configured according to actual needs, and is not limited herein.

In some embodiments, the lighting device C may include a strip light, a bar-shaped light, a cylinder-shaped light, a plane light (containing a plurality of light beads), or a space-arranged light. Any type of light may be used.

In some embodiments, the lighting device C may include a control unit and a lighting unit, and the control unit may be used to control the lighting effect of the lighting unit according to the control device B.

In some embodiments, the lighting device C may include one or more lighting units, which can be combined according to actual needs.

In some embodiments, each light unit can contain one or more light beads, and the control unit can control the brightness, color, etc. of individual light beads, as well as the number of light beads to be turned on, so as to control different lighting effects of the lighting device.

In some embodiments, according to actual needs, the locations of lighting devices and the number of lighting devices can be configured, and, based on the locations of the lighting devices, the length, height, and lighting area can be controlled to realize lighting effect control.

Figure 2:
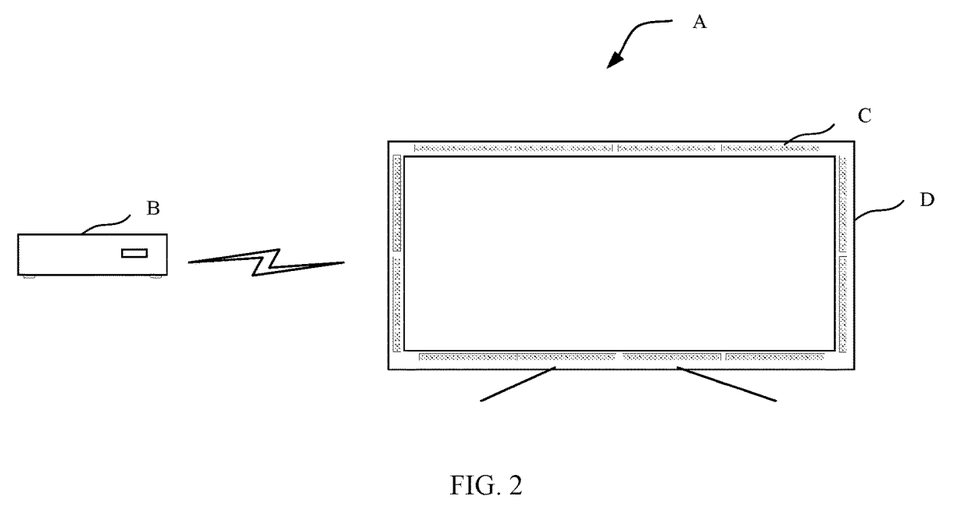
FIG. 2 illustrates a block diagram of another application environment according to an embodiment of the present disclosure.

FIG. 2 illustrates another application environment according to certain embodiments. Referring to FIG. 2, in some embodiments, the lighting control system A may further include a display device D, and the display device D and the control device B may be connected in a wired or wireless manner. The display device D may include any appropriate device capable of displaying images, such as a tablet computer, a mobile phone, and a television, etc., which may be selected according to actual needs.

The display device D, the lighting device C, and the control device B may be connected through a network. The network is usually the Internet, but can be any network, including a Local Area Network (LAN), a Metropolitan Area Network (MAN), Wide Area Network (WAN), a mobile, wired or wireless network, a private network, a virtual private network, or any combination thereof. In some embodiments, the display device D, the lighting device C, and the control device B may also communicate with each other through a specific communication protocol. The communication protocol may include the BLE (Bluetooth low energy) protocol, WLAN (Wireless Local Area Network) protocol, Bluetooth protocol, ZigBee protocol or Wi-Fi (Wireless Fidelity) protocol, etc. The network may also include network entities such as routers and gateways, which are not shown in FIG. 2.

Further, the display device D may display the to-be-tested video stream, and the control device B may obtain a sequence of video frame images by dividing frames of a to-be-tested video stream; from the sequence of video frame images, obtain a recognition result of a video frame image in the sequence of video frame images by performing an image recognition process on the video frame image; if it is determined that the video frame image includes a target virtual object based on the recognition result, control the lighting effect of the lighting device C based on the state information of the target virtual object.

It should be noted that above application environment of the lighting effect control system shown in FIG. 1 and FIG.

2 are only examples, and the lighting effect control system and application environment described in the embodiments of the present disclosure are for more clearly illustrating the technical solutions of the present disclosure, and do not constitute any limitation on the technical solutions provided by the present disclosure. Those skilled in the art know that, with the evolution of the lighting effect control system and the emergence of new business application scenarios, the technical solutions provided by the embodiments of the present disclosure can solve similar technical problems.

Figure 3:
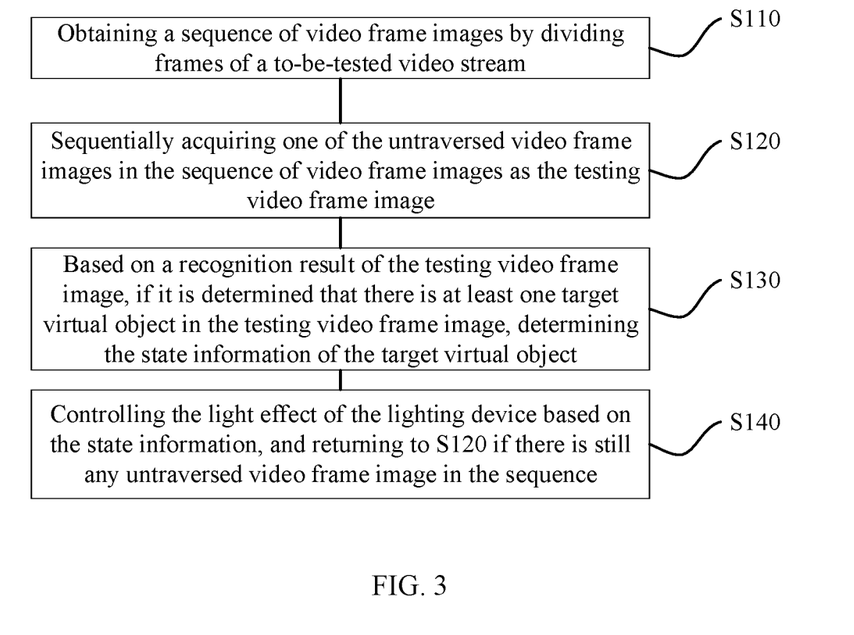
FIG. 3 illustrates a flowchart of a lighting effect control method according to an embodiment of the present disclosure.

In certain embodiments of the present disclosure, the control device B may also perform a lighting effect control method described in the followings. FIG. 3 illustrates a flowchart of a lighting effect control method according to an embodiment of the present disclosure.

Referring to FIG. 3, the lighting effect control method can be applied to a control device, and the lighting effect control method may include following S110 to S130:

S110: obtaining a sequence of video frame images by dividing frames of a to-be-tested video stream.

In certain existing lighting equipment control technologies, when an image is displayed on the display device, the change of lighting effect can be controlled according to the image. However, such change of the lighting effect is changed according to the overall color of the image, and the lighting effect often cannot be changed according to changes of specific objects in the image, which affects the user's immersive experience.

To solve these issues, the embodiments of the present disclosure provide an improved lighting effect control method that changes the lighting effect according to the specific content in the image. Accordingly, the changes of the lighting effect may be substantially correlated to the changes of the displayed content of the frame image, so as to realize changing the lighting effect according to the specific content in the frame image.

In one embodiment, the control device may perform a frame division process on the to-be-tested video stream, that is, dividing the to-be-tested video stream into multiple frames of video frame images, thereby obtaining a sequence of video frame images. Specifically, the video frame images may be arranged in time order to obtain a sequence of video frame images.

The frame division process on the to-be-tested video stream can also be performed by calling various software programs, such as AE (Adobe After Effects, nonlinear special effects synthesis software), PR (Adobe Premiere, video editing software), and other software programs that can perform video editing. The type or types of software programs can be selected according to actual requirements, and is not limited herein.

In some embodiments, before performing the frame division process on the to-be-tested video stream to obtain the video frame image sequence, the followings may also be performed:

(1) Obtaining an original video stream;
(2) Generating at least two to-be-tested video streams based on the original video stream;
(3) Sending one of the to-be-tested video streams to the display device, so that the display device can display the one to-be-tested video stream;

The process of performing the frame division process on the to-be-tested video stream to obtain the video frame image sequence may include:

(4) Performing the frame division process on the other to-be-tested video stream to obtain the video frame image sequence.

That is, after the control device obtains the original video stream, the control device may generate at least two to-be-tested video streams based on the obtained original video stream. The content in the generated at least two to-be-tested video streams is the same, and one of the to-be-tested video streams is used to display the image content in the to-be-tested video stream by the display of the control device, and the other to-be-tested video stream is divided into frames to obtain the video frame image sequence that composes the to-be-tested video stream. For example, after the control device obtains an original video stream related to game content, it generates two to-be-tested video streams according to the original video stream. One to-be-tested video stream is used to control the display device to display the game content, and the other to-be-tested video stream also includes the game content and is used to perform the frame division process to obtain a sequence of video frame images constituting the game content displayed on the display device.

Figure 4:
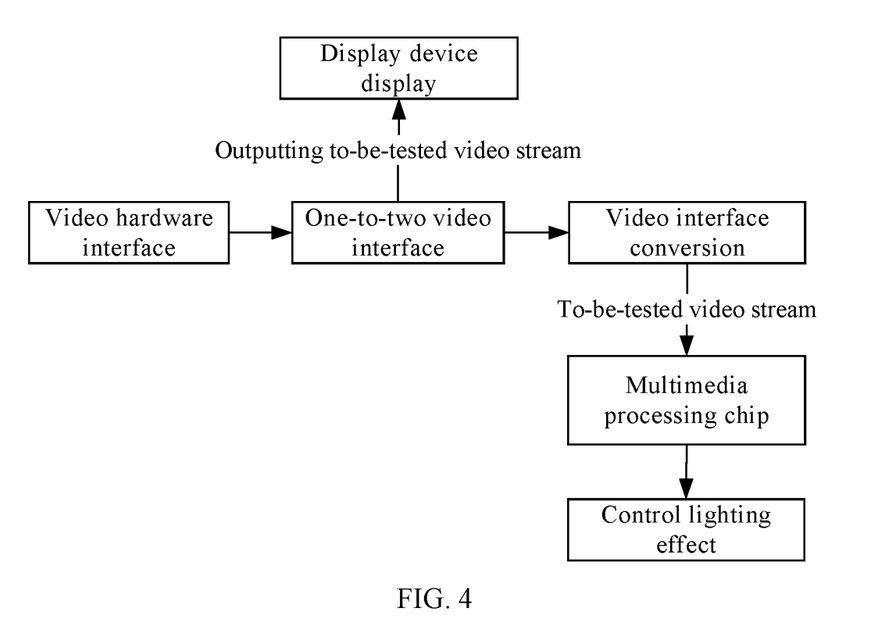
FIG. 4 illustrates a flowchart of generating a to-be-tested video stream according to an embodiment of the present disclosure.

As shown in FIG. 4, the original video stream is inputted to the control device through the hardware interface. After receiving the original video stream, it is divided into two to generate at least two to-be-tested video streams, one of which is used to control the display device to display the specific image content, and the other one is used to be converted to a video stream type that can be received by the multimedia processing chip through a video interface. Further, the multimedia processing chip is used to divide the to-be-tested video stream into frames to obtain the video frame image sequence, so as to control the lighting device to change the lighting effect. The hardware interface may be, for example, VGA (Video Graphics Array), DP (Display-Port), HDMI (High Definition Multimedia Interface), DVI (Digital Visual Interface), etc.; The video interface may be, for example, MIPI (Mobile Industry Processor Interface), LVDS (Low-Voltage Differential Signaling), etc. The multimedia processing chip may be, for example, an SOC (System on Chip) chip. Furthermore, outputting the original video stream may be realized by using a video capture card.

In some embodiments, the lighting effect control method further includes:

(2.1) When, in response to the control operation, the display device enters a display state corresponding to the control operation, control the lighting device to present the lighting effect corresponding to the control operation.

For example, after the user performs a control operation on the display device, the display device enters a display state corresponding to the control operation (such as shutting down, pausing, etc.), and the control device controls the lighting device to present or display the lighting effect corresponding to the control operation by the user or the display state. For example, after the user turns off the display device so that it does not display images, the control device controls the light device to turn off so that it does not emit light.

By controlling the lighting effect of the lighting device according to the user's control operation on the display device, it can avoid the situation that the display device is turned off but the lighting effect is still changing, so that the lighting device can better follow the video frame image displayed on the display device to change the lighting effect.

In some embodiments, the lighting device includes one or more lighting units. In general, the more lighting units, the richer the lighting effect, and the better the user's immersive experience.

Step S120: sequentially acquiring one of the untraversed video frame images in the sequence of video frame images as the testing video frame image.

In certain embodiments of the present disclosure, the control device may sequentially acquire one of the untraversed video frame images in the video image sequence in a chronological order as the testing video frame image, so as to control the current lighting effect of the lighting device according to the testing video frame image.

For example, if the video frame image sequence includes a first image, a second image, and the third image, where the time of the first image is earlier than the time of the second image, and the time of the second image is earlier than the time of the third image. The control device has acquired the first image and controlled the lighting effect of the lighting device according to the first image, then the untraversed video frame images in the video frame image sequence are the second image and the third image. Further, because the time of the second image is earlier than the time of the third image, the second image is acquired as the testing video frame image in the next turn.

Step S130: based on a recognition result of the testing video image, if it is determined that there is at least one target virtual object in the testing video frame image, determining the state information of the target virtual object in the testing video frame image. The recognition result of the testing video frame image may be obtained through an image recognition process performed on the testing video frame image.

Step S140: controlling the light effect of the lighting device based on the state information. If there is still any untraversed video frame image in the sequence of video frame images, the light effect method may return to S120 to continue processing the images and controlling the light effect of the lighting device.

In certain embodiments of the present disclosure, the control device performs an image recognition process on the video frame images in the video frame image sequence to obtain the recognition result of the video frame images after the to-be-tested video stream is divided into frames and the video frame image sequence is obtained. For example, after performing image recognition processing on a video frame image, it is found that there are 8 small birds and a big tree in the image.

Specifically, the control device may perform the image recognition process on the video frame image using an AI (Artificial Intelligence) target detection model deployed on the device side to obtain a recognition result corresponding to the video frame image. The AI target detection model may be based on a target detection algorithm, such as SSD, yolo series, and R-CNN, etc. For example, when the video content of the to-be-tested video stream is a shooting game, the AI target detection model can distinguish the density and number changes of the enemy's distribution position.

In some embodiments, the control device can also recognize the video frame image by calling other software program capable of image recognition, so as to control the lighting device to change the lighting effect according to the recognition result.

Optionally, the control device may recognize video frame images sequentially, that is, only obtain a recognition result corresponding to one video frame image at a time.

Optionally, when the control device uses multi-threads for image recognition, multiple video frame images can be recognized at one time, thereby speeding up the speed of video frame image recognition.

Optionally, multiple video frame images can be combined into one large video frame image for recognition, and the recognition result of each large video frame image includes recognition results corresponding to multiple video frame images, thereby reducing the number of image recognition processes performed.

In some embodiments, the control device may sequentially perform the image recognition process on each video frame image in the sequence of video frame images in chronological order to obtain a recognition result corresponding to each video frame image.

Further, in order to make the lighting effect change of the lighting device correspond to the content displayed on the display device, the video frame image recognition results can be acquired according to the time sequence, so that the lighting device can be controlled to change the lighting effect according to the recognition results.

In some embodiments, since the content of video frame images of adjacent frames may have little difference, in order to make the change of lighting effect tend to be moderate, the recognition result of the next video frame image can be compared with the previous frame video frame image. That is, the recognition results of adjacent frames may be compared, and if the difference between the state information of the target virtual object in the recognition results is less than or equal to a preset threshold, the lighting effect will not be changed.

In certain embodiments of the present disclosure, it may be determined whether there is a target virtual object in the testing video frame image according to the recognition result of the testing video frame image. Specifically, the control device can determine whether there is a target virtual object in the testing video frame image according to the recognition result of the testing video frame image, that is, whether there is user-preset image information, such as people, objects, animals, monsters, etc., in the testing video frame image. If it is determined, according to the recognition result, that there is a target virtual object in the recognized testing video frame image, the lighting effect of the lighting device is controlled according to the state information of the target virtual object.

In some embodiments, the target virtual object may be a special attack effect. For example, when the protagonist attacks a monster by spewing poison, the special attack effect produced when the poison is successfully spewed is green, and the light effect of the lighting device is controlled to display green light.

In some embodiments, the state information may be, for example, the number, height, size, position, etc., of the target virtual objects.

In some embodiments, the state information of the target virtual object may be the position of the target virtual object. For example, when the target virtual object is a monster, it can be set that when the position of the monster is in the warning area, the lighting effect of the lighting device can be controlled, for example, by increasing the flickering frequency of the lighting device.

Further, the state information of the target virtual object may also include the direction of the attack, the charging time of the attack, the range of the attack, and the like.

In some embodiments, the lighting effect control method may further include the followings:

(1.1) Determining a real-time scene corresponding to the testing video frame image. The process of controlling the lighting effect of the lighting device according to the state information may include:

(1.2) Controlling the lighting effects of lighting equipment based on the real-time scene and the state information.

Specifically, using the real-time scene may make the change of lighting effect consistent with the testing video frame image, enrich the change of lighting effect, so as to bring users a better sense of immerse experience. Also, the real-time scene in the image may be combined together with other factors to control the change of lighting effect. The control device can determine the real-time scene corresponding to the testing video frame image (for example: day, night, forest, grass, etc.) according to the image recognition result of the testing video frame, and control the lighting device to change lighting effect according to the recognized real-time scene and the state information of the target virtual object. For example, when the recognition result determines that the corresponding real-time scene in the video frame image is night, it can be controlled to increase the brightness of the light of the lighting device as the number of target virtual objects increases.

In some embodiments, the state information of the target virtual object at least includes the number of the target virtual objects and/or the distance to a preset virtual object.

The preset virtual object may be another image information preset by the user, and the control device controls the lighting effect of the lighting device according to the number of target virtual objects and/or the distance between the target virtual object(s) and the preset virtual object. For example, the lighting effect control rule can be set that, the higher the number is and/or the closer the distance is, the dimmer the light brightness will be.

In some embodiments, the process of, if it is determined according to the recognition result of the testing video frame image that there is a target virtual object in the testing video frame image, determining the state information of the target virtual object in the testing video frame image further includes:

(2.1) If it is determined that there is a target virtual object in the testing video frame image according to the recognition result of the testing video frame image, acquiring a preset number of video frame images before the testing video frame image as the state video frame images.

(2.2) Determining the state information of the target virtual object in the state video frame images and determining the state information of the target virtual object in the testing video frame image.

In some embodiments, the lighting effect of the lighting device is controlled according to the state information as follows.

(3.1) Determining the change information of the target virtual object according to the state information of the target virtual object in the state video frame image(s) and the state information of the target virtual object in the testing video frame image.

(3.2) Controlling the lighting effect of the lighting device according to the change information.

For example, if the control device determines that there is at least one target virtual object in the testing video frame image according to the recognition result of the testing video frame image, the control device sequentially acquires a preset number of video frame images before the testing video frame according to the time sequence displayed on the display device as the state video frame images, determines the state information of the target virtual object in each state video frame image, and based on the state information of the target virtual object in the state video frame images and the state information of the target virtual object in the testing video frame image, determines the change information of the target virtual object (such as quantity change, type change, distance change, etc.), and finally controls the lighting effect change of the lighting device according to the obtained change information.

For example, when the content of the to-be-tested video stream is a doomsday survival game, the target virtual object can be set as one or more of zombies, mutated animals and plants, and the protagonist can be set as the preset virtual object. Further, based on the number of zombies, mutated animals and plants, and the distance from the protagonist to control the change of the lighting effect of the lighting device. When the protagonist is in a safe state, the lights display soothing colors, such as blue, white, etc. After obtaining a preset number of video frame images and corresponding image recognition processing, the change information is determined to be, for example, more and more in number of the target virtual objects, and the distance from the protagonist is getting closer and closer. Therefore, it is possible to set the color of the light device gradually to transition to a dangerous red color as the number of zombies and mutated animals and plants increases, and the closer to the protagonist, the faster the flashing frequency of the lights.

Accordingly, the embodiments of the present disclosure provide a lighting effect control method including: obtaining a video frame image sequence by performing frame division processing on the to-be-tested video stream; sequentially acquiring one of the untraversed video frame images in the video frame image sequence as the testing video frame image; according to a recognition result on the testing video frame image, if it is determined that there is at least one target virtual object in the testing video frame image, determining the state information of the target virtual object in the testing video frame image; where the recognition result of the testing video frame image is obtained by performing an image recognition process on the testing video frame image; and the state information is used to control the lighting effect of the lighting device. In this way, the lighting effect of the lighting device can be controlled to change according to the state of the target virtual object in the image, so that the lighting effect can be transformed according to the displayed content in the image, which greatly enriches the control ways of the lighting effect.

Figure 5:
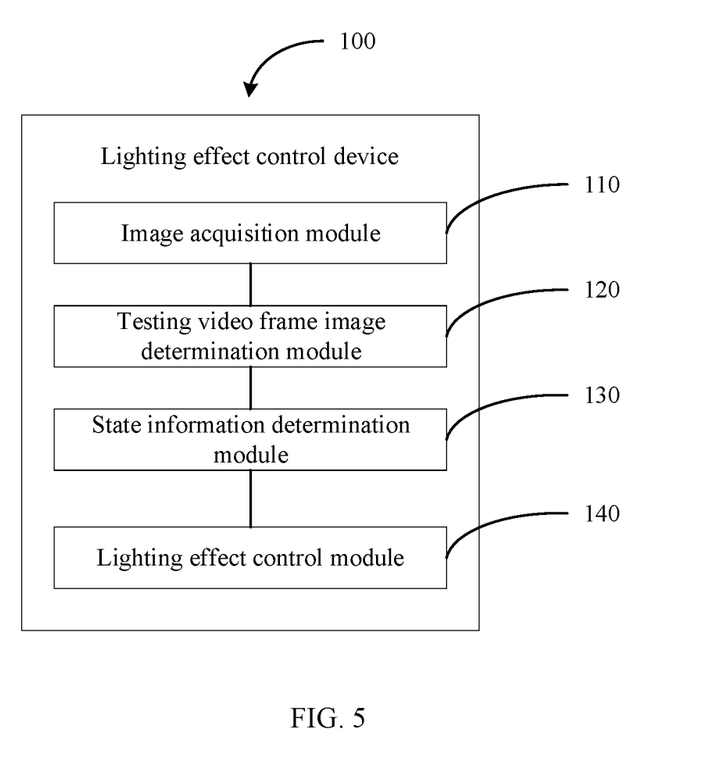
FIG. 5 illustrates a block diagram of a lighting effect control device according to an embodiment of the present disclosure.

FIG. 5 illustrates a block diagram of a lighting effect control device according to an embodiment of the present disclosure. As shown in FIG. 5, the lighting effect control device 100 may include an image acquisition module 110, a testing video frame image determination module 120, a state information determination module 130, and a lighting effect control module 140.

The image acquisition module 110 is configured to perform a frame division process on the to-be-tested video stream to obtain a sequence of video frame images.

The testing video frame image determination module 120 is configured to sequentially acquire one of the untraversed video frame images in the sequence of video frame images as the testing video frame image.

The state information determination module 130 is used to determine if there is a target virtual object in the testing video frame image according to a recognition result of the testing video frame image, and determine the state information of the target virtual object in the testing video frame image. The recognition result of the testing video frame image is obtained by performing an image recognition process on the testing video frame image.

The lighting effect control module 140 is configured to control the lighting effect of the lighting device according to the state information.

In some embodiments, the lighting effect control device further includes a scene determination module configured to determine a real-time scene corresponding to the video frame image. The lighting effect control module 140 is also used to control the lighting effect of lighting device based on the real-time scene and the state information.

In some embodiments, the state information of the target virtual object at least includes the number of the target virtual objects and/or the distance to a preset virtual object.

In some embodiments, the state information determining module 130 includes a state video frame image acquisition unit and a change information determination unit.

The state video frame image acquisition unit is used to obtain a preset number of video frame images before the testing video frame as state video frame images if it is determined that there is a target virtual object in the testing video frame image according to the recognition result of the testing video frame image.

The change information determination unit is configured to determine the change information of the target virtual object according to the state information of the target virtual object in the state video frame images and the state information of the target virtual object in the testing video frame image.

In some embodiments, the lighting effect control module 140 is further configured to control the lighting effects of the lighting device according to the change information.

In some embodiments, the lighting effect control device 100 also includes a difference determination module configured to, according to the recognition result of the testing video frame image and the recognition result of the previous frame video frame image, determine the difference between the state information of the target virtual objects in the testing video frame image and the previous frame video frame image.

In some embodiments, the lighting effect control module 140 is further configured to control the lighting effect of the lighting device according to the state information if the difference is greater than a preset threshold.

In some embodiments, the lighting effect control device 100 further includes a video stream acquisition module configured to acquire an original video stream; a to-be-tested video stream generation module configured to generate at least two to-be-tested video streams based on the original video stream; and a display module configured to display one of the to-be-tested video streams.

The image acquisition module 110 is further configured to perform frame division processing on the other to-be-tested video stream to obtain a video frame image sequence.

In some embodiments, the lighting effect control device 100 further includes a control module. The control module is used to, in response to the control operation on the display device, control the display device to enter the display state corresponding to the control operation and, at the same time, control the lighting device to display the lighting effect state corresponding to the control operation.

In some embodiments, the lighting device includes one or more lighting units.

Those skilled in the art can clearly understand that for the convenience and brevity of the description, the specific working process of the devices and modules described above can refer to the corresponding process in the foregoing method embodiments, which will not be repeated here.

In several embodiments provided in the present disclosure, the coupling between the modules may be electrical, mechanical, or other forms of coupling.

In addition, each functional module in each embodiment of the present disclosure may be integrated into one processing module, each module may exist separately physically, or two or more modules may be integrated into one module. The above-mentioned integrated modules can be implemented in the form of hardware or in the form of software function modules.

Figure 6:
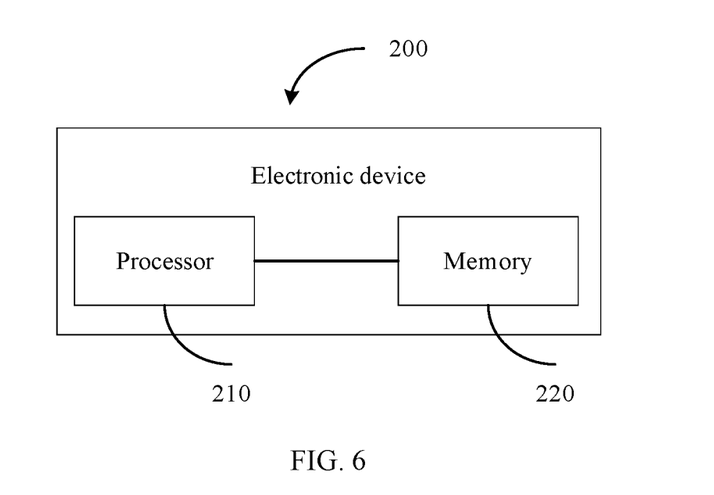
FIG. 6 illustrates a block diagram of an electronic device according to an embodiment of the present disclosure.

FIG. 6 illustrates a block diagram of an electronic device 200 according to an embodiment of the present disclosure. Referring to FIG. 6, the electronic device 200 may include a smart phone, a tablet computer, an e-book, or a touch screen, etc., which may be capable of running application programs. The electronic device 200 according to the present disclosure may include one or more of the following components: a processor 210, a memory 220, and one or more application programs, where one or more application programs may be stored in the memory 220 and configured to be executed by one or more processors 210, and one or more programs are configured to execute the methods described in the foregoing embodiments.

Processor 210 may include one or more processing cores. The processor 210 uses various interfaces and lines to connect various parts of the entire electronic device, and executes the functions of the electronic device and data processing by running or executing instructions, programs, code sets or instruction sets stored in the memory, and calling data stored in the memory. Optionally, the processor 210 may be implemented in a hardware form including at least one of digital signal processing (DSP), field programmable gate array (FPGA), programmable logic array (PLA), or other hardware form of hardware. The processor 210 may be one of or a combination of a central processing unit (CPU), an image processor (GPU), a modem, and the like. Among them, the CPU mainly handles the operating system, user interface and application programs, etc.; and the GPU is used to render and draw the displayed content; the modem is used to handle wireless communication. It can be understood that, the above-mentioned modem might not be integrated into the processor, but may be realized by a communication chip alone.

The memory 220 may include a random access memory (RAM), and may also include a read-only memory (ROM). Memory may be used to store instructions, programs, code, sets of codes, or sets of instructions. The memory may include a program storage area and a data storage area, wherein the program storage area may store instructions for realizing an operating system, instructions for realizing at least one function (such as image recognition function, frame processing function, etc.), and for realizing instructions and the like of the disclosed embodiments. The storage data area can also store data created by the terminal during use (such as video frame images, status information, change information, etc.) and the like.

Figure 7:
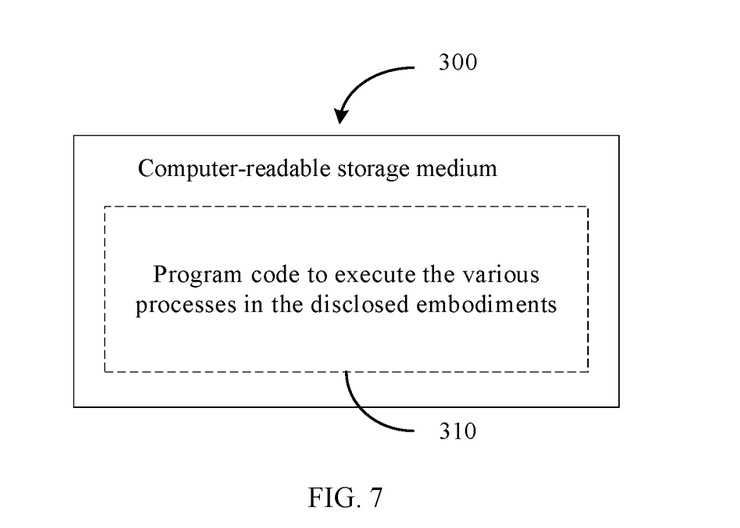
FIG. 7 illustrates a structural frame of a computer storage medium according to an embodiment of the present disclosure.

FIG. 7 illustrates a structural frame of a computer storage medium 300 according to an embodiment of the present disclosure. Referring to FIG. 7, the computer-readable storage medium 300 stores program code 310, and the program code 310 can be invoked by a processor to execute the methods described in the foregoing method embodiments.

The computer readable storage medium 300 may be an electronic memory such as flash memory, EEPROM (Electrically Erasable Programmable Read Only Memory), EPROM, hard disk, or ROM. Optionally, the computer-readable storage medium includes a non-transitory computer-readable storage medium (non-transitory computer-readable storage medium). The computer-readable storage medium 300 has a storage space for program codes for executing any method steps in the above methods. These program codes can be read from or written into one or more computer program products. The program code can be compressed in a suitable form.

One embodiment of the present disclosure also provides a computer program product or computer program, where the computer program product or computer program includes computer instructions, and the computer instructions are stored in a computer-readable storage medium. The processor of the computer device reads the computer instructions from the computer-readable storage medium, and the processor executes the computer instructions, so that the computer device executes the lighting effect control method described in the various optional embodiments above.

Accordingly, the present disclosure provides a lighting effect control method, system, device, storage medium and computer equipment. Obtaining a video frame image sequence by performing frame division processing on the to-be-tested video stream; sequentially acquiring one of the untraversed video frame images in the video frame image sequence as the testing video frame image; according to a recognition result on the testing video frame image, if it is determined that there is at least one target virtual object in the testing video frame image, determining the state information of the target virtual object in the testing video frame image; where the recognition result of the testing video frame image is obtained by performing an image recognition process on the testing video frame image; and the state information is used to control the lighting effect of the lighting device. In this way, the lighting effect of the lighting device can be controlled to change according to the state of the target virtual object in the image, so that the lighting effect can be transformed according to the displayed content in the image, which greatly enriches the control ways of the lighting effect.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A lighting effect control method, comprising:
obtaining a video frame image sequence by dividing frames of a to-be-tested video stream;
sequentially acquiring one of untraversed video frame images in the video frame image sequence as a testing video frame image;
according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and
controlling the lighting effect of a lighting device based on the state information.

2. The method according to claim 1, further comprising:
determining a real-time scene corresponding to the testing video frame image,
wherein the controlling the lighting effect of the lighting device according to the state information further includes:
controlling the lighting effects of the lighting device based on the real-time scene and the status information.

3. The method according to claim 1, wherein the state information of the target virtual object includes at least a number of the target virtual object and/or a distance to a preset virtual object.

4. The method according to claim 1, wherein:
the determining that there is at least one target virtual object in the testing video frame image, and determining state information of the target virtual object in the testing video frame image further includes:
after determining that there is at least one target virtual object in the testing video frame image, obtaining a preset number of video frame images before the testing video frame as state video frame images; and
determining state information of the target virtual object in the state video frame images and the state information of the target virtual object in the testing video frame image,
the controlling the lighting effect of the lighting device according to the state information includes:
determining change information of the target virtual object according to the state information of the target virtual object in the state video frame images and the state information of the target virtual object in the testing video frame image; and
controlling the lighting effect of the lighting device according to the change information.

5. The method according to claim 1, further comprising:
determining a difference between state information of the target virtual object according to the recognition result of the testing video frame image and a recognition result of a previous video frame image,
wherein the controlling the lighting effect of the lighting device according to the state information further includes:
when the difference is greater than a preset threshold, controlling the lighting effect of the lighting device according to the state information.

6. The method according to claim 1, before dividing frames of a to-be-tested video stream to obtain a video frame image sequence, further comprising:
obtaining an original video stream;
generating at least two to-be-tested video streams based on the original video stream; and
sending one of the to-be-tested video streams to a display device, so that the display device displays the to-be-tested video stream,
wherein the dividing frames of a to-be-tested video stream to obtain a video frame image sequence further includes:
dividing the other to-be-tested video stream to obtain the video frame image sequence.

7. The method according to claim 6, further comprising:
when, in response to a control operation, the display device enters into a display state corresponding to the control operation, controlling the lighting effect of the lighting device corresponding to the control operation.

8. The method according to claim 1, wherein the lighting device comprises one or more lighting units.

9. An electronic device, comprising:
one or more processors; and
a memory coupled to the processors and storing one or more application programs,
wherein the one or more application programs are configured to be executed by the one or more processors to perform:
obtaining a video frame image sequence by dividing frames of a to-be-tested video stream;
sequentially acquiring one of untraversed video frame images in the video frame image sequence as a testing video frame image;
according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and
controlling the lighting effect of a lighting device based on the state information.

10. The electronic device according to claim 9, wherein the one or more application programs are configured to be executed by the one or more processors to further perform:
determining a real-time scene corresponding to the testing video frame image,
wherein the controlling the lighting effect of the lighting device according to the state information further includes:
controlling the lighting effects of the lighting device based on the real-time scene and the status information.

11. The electronic device according to claim 9, wherein the state information of the target virtual object includes at least a number of the target virtual object and/or a distance to a preset virtual object.

12. The electronic device according to claim 9, wherein:
the determining that there is at least one target virtual object in the testing video frame image, and determining state information of the target virtual object in the testing video frame image further includes:
after determining that there is at least one target virtual object in the testing video frame image, obtaining a preset number of video frame images before the testing video frame as state video frame images; and
determining state information of the target virtual object in the state video frame images and the state information of the target virtual object in the testing video frame image,
the controlling the lighting effect of the lighting device according to the state information includes:
determining change information of the target virtual object according to the state information of the target virtual object in the state video frame images and the state information of the target virtual object in the testing video frame image; and
controlling the lighting effect of the lighting device according to the change information.

13. The electronic device according to claim 9, wherein the one or more application programs are configured to be executed by the one or more processors to further perform:
determining a difference between state information of the target virtual object according to the recognition result of the testing video frame image and a recognition result of a previous video frame image,
wherein the controlling the lighting effect of the lighting device according to the state information further includes:
when the difference is greater than a preset threshold, controlling the lighting effect of the lighting device according to the state information.

14. The electronic device according to claim 9, wherein, before dividing frames of a to-be-tested video stream to obtain a video frame image sequence, the one or more application programs are configured to be executed by the one or more processors to further perform:
obtaining an original video stream;
generating at least two to-be-tested video streams based on the original video stream; and
sending one of the to-be-tested video streams to a display device, so that the display device displays the to-be-tested video stream,
wherein the dividing frames of a to-be-tested video stream to obtain a video frame image sequence further includes:
dividing the other to-be-tested video stream to obtain the video frame image sequence.

15. The electronic device according to claim 14, wherein the one or more application programs are configured to be executed by the one or more processors to further perform:
when, in response to a control operation, the display device enters into a display state corresponding to the control operation, controlling the lighting effect of the lighting device corresponding to the control operation.

16. The electronic device according to claim 9, wherein the lighting device comprises one or more lighting units.

17. A non-transitory computer-readable storage medium containing computer-executable program codes for, when executed by one or more processors, performing a lighting effect control method, the method comprising:
obtaining a video frame image sequence by dividing frames of a to-be-tested video stream;
sequentially acquiring one of untraversed video frame images in the video frame image sequence as a testing video frame image;
according to a recognition result of the testing video frame image, determining that there is at least one target virtual object in the testing video frame image, and determining state information of the target virtual object in the testing video frame image, wherein the recognition result of the testing video frame image is obtained by performing an image recognition process on the testing video frame image; and
controlling the lighting effect of a lighting device based on the state information.

18. The non-transitory computer-readable storage medium according to claim 17, the method further comprising:
determining a real-time scene corresponding to the testing video frame image,
wherein the controlling the lighting effect of the lighting device according to the state information further includes:
controlling the lighting effects of the lighting device based on the real-time scene and the status information.

19. The non-transitory computer-readable storage medium according to claim 17, wherein the state information of the target virtual object includes at least a number of the target virtual object and/or a distance to a preset virtual object.

20. The non-transitory computer-readable storage medium according to claim 17, wherein:

the determining that there is at least one target virtual object in the testing video frame image, and determining state information of the target virtual object in the testing video frame image further includes:

after determining that there is at least one target virtual object in the testing video frame image, obtaining a preset number of video frame images before the testing video frame as state video frame images; and determining state information of the target virtual object in the state video frame images and the state information of the target virtual object in the testing video frame image, the controlling the lighting effect of the lighting device according to the state information includes:

determining change information of the target virtual object according to the state information of the target virtual object in the state video frame images and the state information of the target virtual object in the testing video frame image; and controlling the lighting effect of the lighting device according to the change information.

\* \* \* \* \*